United States Patent
Tam et al.

(10) Patent No.: US 8,867,352 B2
(45) Date of Patent: Oct. 21, 2014

(54) RECEIVER BASED POWER EFFICIENT TRANSMITTER FOR ETHERNET

(75) Inventors: Derek Tam, Irvine, CA (US); Kevin Tunghai Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 481 days.

(21) Appl. No.: 12/770,222

(22) Filed: Apr. 29, 2010

(65) Prior Publication Data

US 2011/0158137 A1     Jun. 30, 2011

Related U.S. Application Data

(60) Provisional application No. 61/291,514, filed on Dec. 31, 2009.

(51) Int. Cl.
| | |
|---|---|
| G01R 31/08 | (2006.01) |
| H04L 12/40 | (2006.01) |
| H04L 5/14 | (2006.01) |
| H04L 12/10 | (2006.01) |
| H04L 25/02 | (2006.01) |

(52) U.S. Cl.
CPC .......... *H04L 12/10* (2013.01); *H04L 12/40045* (2013.01); *H04L 25/0278* (2013.01); *H04L 25/0288* (2013.01); *H04L 5/1423* (2013.01); *H04L 12/40032* (2013.01)
USPC ............................ 370/231; 370/229; 370/333

(58) Field of Classification Search
CPC ......... H04L 5/1423; H04L 5/16; H04L 47/10; H04L 12/5602; H04L 47/2441; H04L 1242/5636
USPC ........................................................ 370/282
See application file for complete search history.

(56) References Cited

U.S. PATENT DOCUMENTS

| | | | | |
|---|---|---|---|---|
| 5,247,540 | A * | 9/1993 | Hoge | 375/220 |
| 5,541,759 | A * | 7/1996 | Neff et al. | 398/139 |
| 6,282,177 | B1* | 8/2001 | Ostermiller et al. | 370/278 |
| 7,706,917 | B1* | 4/2010 | Chiappetta et al. | 700/245 |
| 2005/0041727 | A1* | 2/2005 | Agazi | 375/219 |
| 2006/0120491 | A1* | 6/2006 | Yen et al. | 375/345 |
| 2007/0296456 | A1 | 12/2007 | van der Goes et al. | |
| 2009/0135752 | A1* | 5/2009 | Su et al. | 370/311 |
| 2009/0274201 | A1* | 11/2009 | Yu | 375/219 |
| 2009/0290659 | A1* | 11/2009 | Petrovic et al. | 375/340 |
| 2010/0151799 | A1* | 6/2010 | Kim et al. | 455/73 |

\* cited by examiner

*Primary Examiner* — John Blanton
*Assistant Examiner* — Abu-Sayeed Haque
(74) *Attorney, Agent, or Firm* — Sterne, Kessler, Goldstein & Fox P.L.L.C.

(57) ABSTRACT

Systems and methods are used to adjust, e.g., reduce, current driving a transmitter, i.e., to reduce transmitter power consumption, based on an actual value of a received signal from received along a cable. For example, this is very beneficial to an Ethernet system where the received signal is attenuated by the lossy cable. In this case, the transmitter power consumption can be lowered during a normal application where data is transmitted and received through the cable.

20 Claims, 6 Drawing Sheets

RECEIVER BASED POWER EFFICIENT TRANSMITTER FOR ETHERNET

CROSS REFERENCE TO RELATED APPLICATIONS

This application claims priority under 35 U.S.C. §119(e) to U.S. Provisional Application No. 61/291,514, filed Dec. 31, 2009, which is incorporated by reference herein in its entirety.

FIELD OF THE INVENTION

The present invention generally relates to reducing required transmitter drive current in an Ethernet environment.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
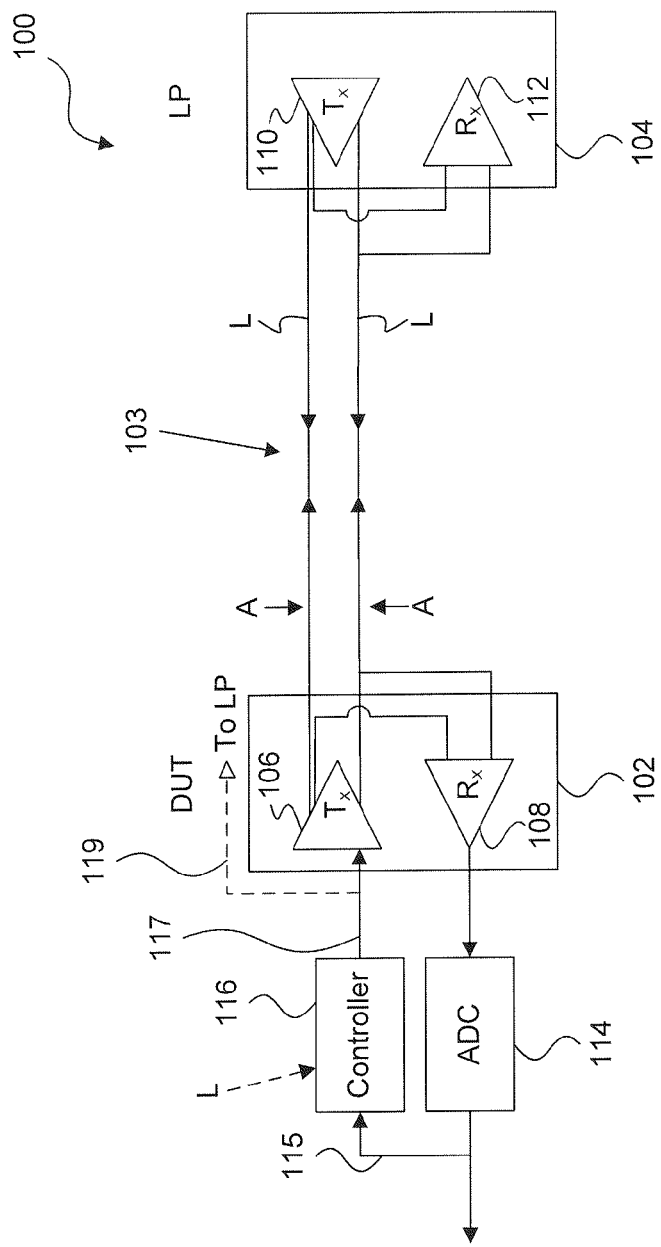
FIG. 1 shows a communications system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The present invention is directed to a receiver based power efficient transmitter for Ethernet. This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The Institute of Electrical and Electronics Engineers (IEEE) inter alia sets the standards for communication devices interchanging information using an Ethernet protocol to allow different manufacturers to produce devices complying with the same specifications, while being compatible to each other. For example 10 BaseT is a Ethernet standard protocol for transmitting digital information at a transmission speed of 10 Mbit/s, 100 BaseT defines digital data transmission at 100 Mbit/s, and 1000 BaseT defines the transmission at 1000 Mbit/s=1 Gbit/s.

The IEEE 802.3 standard defines the parameters for the combined 10 BaseT/100 BaseT/1000 BaseT transmitters using unshielded twisted pair (UTP) lines. For example, IEEE 802.3 defines what voltage levels should be output on the lines, how the switching between the different voltage levels defined for the protocols should be handled, and what termination impedance should be guaranteed on the line.

For the transmission protocols, different parameters are specified in the standard. For example, the highest transmitter linearity is in 1000 BaseT in the presence of an interferer put on the line in full duplex. The highest accuracy of signals is in 100 BaseT mode when fast settling with accurate rise time and accurate output voltage are specified. The 10 BaseT protocol desires the highest voltage swing.

Additional information regarding Ethernet transmitter parameters can be found in, e.g., co-pending, co-owned U.S. Published Patent Appl. No. 2007-0296456, which is incorporated by reference herein in its entirety.

The whole industry is moving in a trend to reduce power-consumption of Ethernet equipment. There is a new standard on IEEE 803.2 where power consumption of the Ethernet is reduced. This is known as Energy Efficient Ethernet (EEE). Therefore, what is needed is a transmitter capable of producing output signals according to one or all of 10 BaseT, 100 BaseT, and 1000 BaseT specifications with low power consumption.

An embodiment of the present invention provides a system comprising a transceiver, a magnitude determining device, and a controller. The transceiver is configured to operate in full-duplex mode. The magnitude determining device is configured to generate a magnitude value of a signal received by the transceiver. The controller is configured to generate a control signal based on the magnitude value. The control signal adjusts current driving the transceiver during transmission of a transmitted signal.

In one example, the control signal adjusts the current to a minimum current value that also allows for generation of a threshold voltage value of the transmitted signal, and can also allow for generation of a threshold value of a receive signal, thereby substantially reducing power consumption of the transceiver.

In another embodiment of the present invention, there is provided a system comprising a transceiver and a controller.

The transceiver is configured to operate in full-duplex mode with a remote transceiver over a communications medium. The controller is configured to generate a control signal based on a length value of the communication medium. The control signal adjusts current driving the transceiver during transmission of a transmitted signal.

In a further embodiment of the present invention, there is provided a method comprising the following steps. Operating a transceiver in full duplex mode. Determining a magnitude of a received signal. Adjusting current driving the transceiver during transmission of a transmitted signal based on the magnitude of the received signal.

In a still further embodiment of the present invention, there is provided a method comprising the following steps. Operating a transceiver in full duplex mode, whereby the transceiver communicates with another transceiver via a communications medium. Adjusting current, based on a length of the communications medium, the current driving a transmitting portion of the transceiver.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FIG. 1 shows a communications system 100. For example, communications system 100 can be an Ethernet communications system operating in full duplex mode. System 100 comprises first and second transceivers 102 and 104 coupled via a communications medium 103 (e.g., UTP lines) having a length L. Thus, in full duplex mode signals are substantially transmitted and received to and from first and second transceivers 102 and 104 along communications medium 103.

In one example, first transceiver 102 includes a transmitting portion Tx 106 and a receiving portion Rx 108. Similarly, second transceiver portion 104 includes a transmitting portion Tx 110 and a receiving portion Rx 112.

In one example, first transceiver 102 is on a device under test (DUT) side of communications system 100 and second transceiver 104 is on a link partner (LP) side of communications system 100. In this example, the DUT side also includes an analog-to-digital converter ADC 114, which in one example can be within, i.e., a part of transceiver 102, and a controller 116. As will be understood, many additional components can be found on both the DUT side and the LP side, but are not discussed here for brevity.

Figure 2:
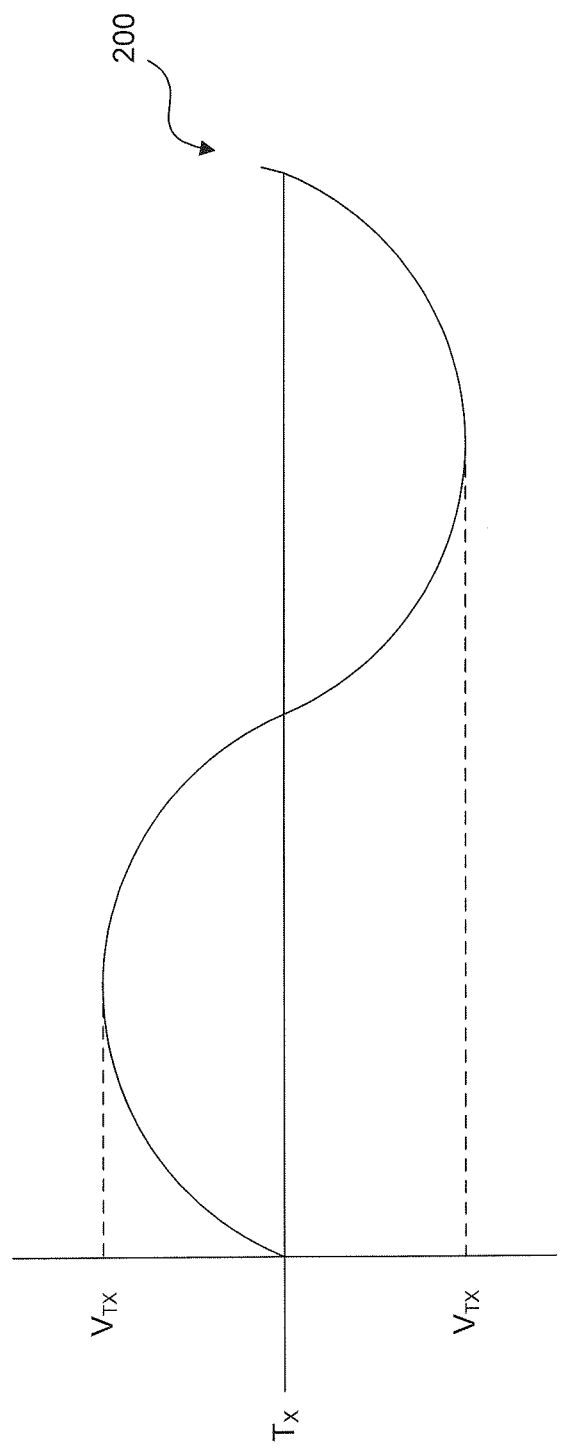
FIG. 2 shows an example transmitted signal wave.
Figure 3:
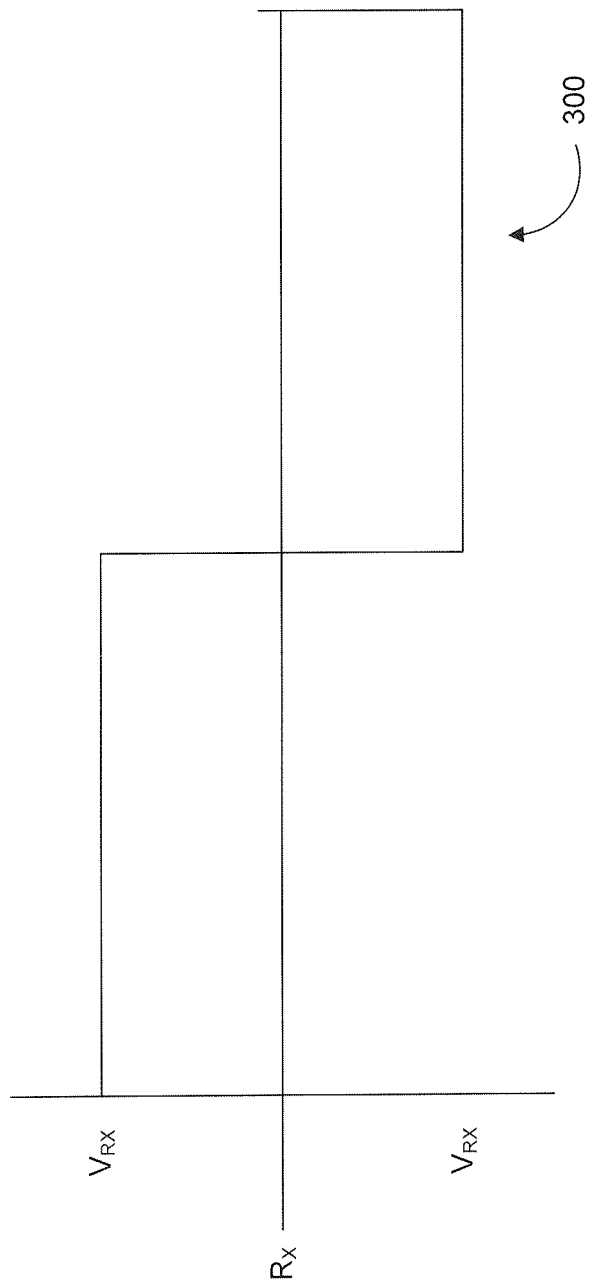
FIG. 3 shows an example received signal wave.
Figure 4:
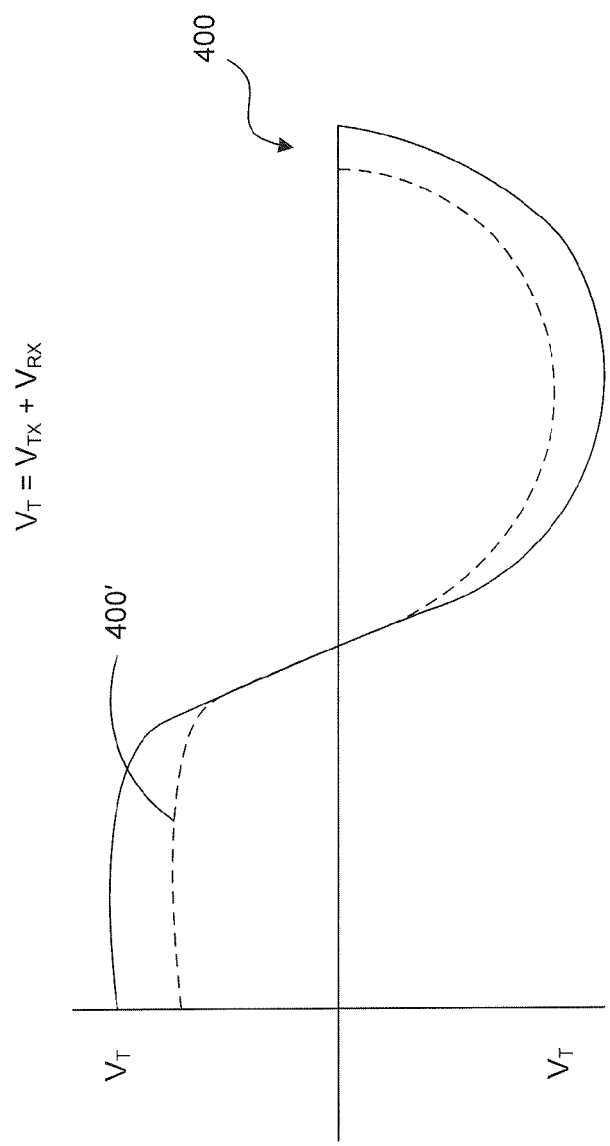
FIG. 4 shows superimposed transmitted and received signal waves.

FIG. 2 shows an example transmitted signal wave 200 with a magnitude Vtx and FIG. 3 shows an example received signal wave 300 with a magnitude Vrx. It is to be appreciated that, although signal 200 is a sine wave and signal 300 is a square wave, any shape signal can be used for signals 200 and 300. FIG. 4 shows a signal 400, i.e., a summation of signals 200 and 300, at point A in FIG. 1 having a magnitude Vt, where Vt=Vtx+Vrx.

The following discussion will be in reference to FIGS. 1-4.

In one example, as is discussed above, first transceiver 102 is a main transceiver. In one example, with respect to point A along communications medium 103, transmitted signal 200 generated and transmitted from first transceiver 102 can be substantially larger in magnitude than received signal 300 received by first transceiver 102. However, depending on the length of medium 103, the loss can vary. If the loss is too small, received signal 300 can be large, where a worst case can be when the loss is zero, and received signal 300 is substantially equal to transmitted 106 signal in amplitude. Without knowing a magnitude of receive signal 300, transmitting portion Tx 106 needs enough current to generate a required minimum magnitude Vt of signal 400, e.g., a worst case scenario of Vt, which may unnecessarily increase drive current and power consumption of transmitting portion Tx 106, as discussed above.

In one example, to meet Ethernet parameters, Vtx is fixed and set to 2 Vppd. Vrx is the receive signal from the link-partner. A maximum signal swing on Vrx is 2 Vppd since the link-partner 110 meets IEEE specification. Vrx is reduced over a longer cable due to the loss over the communication medium 103. Since Vrx is received at the TX driver of 106, the TX driver provides output current to sink or source Vrx. The additional current causes higher power consumption of 106. If the driver design has no information of the incoming RX signal strength, the driver accounts for the worst case scenario, which is 2 Vppd. This is equivalent to 4 Vppd of Vt (400) at 116.

In one example, to reduce required drive current and power consumption, it is desired the driving current be adjusted to be at minimal level needed to still achieve a required Vrx, e.g., to be adjustable based on an actual received signal 300 rather than an worst case received signal 300.

In one example, to determine a minimum drive current, controller 116 receives a magnitude value of received signal 300. For example, the magnitude can be represented by a digital signal 115 generated based on received signal 300 begin processed by ADC 114. Based on signal 115, controller 116 can produce an optimal control signal 117, e.g., a drive current, which optimally drives transmitting portion Tx 106 to produce a threshold value of voltage for transmitted signal Vtx 200 and Vrx 300 to meet the Ethernet parameters. Through being able to adjust the drive current value based on an actual magnitude of received signal 300, a voltage value for transmitted signal 400 (Vtx plus Vrx) can be adjusted, e.g., reduced, to substantially reduce or optimize power consumption of transmitting portion Tx 106. In one example, this may be done in an iterative approach with an initial current value being chosen based on historical received signal magnitudes. Then, after determining an actual magnitude of the received signal, the current value is adjusted until a steady state value is determined.

In another example, to determine a minimum drive current, controller 116 receives a length value L of communications medium 103. Based on the length value L, controller 116 can produce control signal 117, e.g., a current, which optimally drives transmitting portion Tx 106 to produce a threshold value of voltage for total signal 400 to meet Ethernet parameters. For example, control signal 117 can be based on a known lossiness of communications medium 103 that can be based on the length value L of communications medium 103, which correlates to an expected magnitude level of received signal 300. For example, as shown in FIG. 4, a combined signal 400' can be slightly less magnitude than combined signal 400 based on received signal 300 coming from a lossier medium, which reduces its magnitude and reduces the combined signal magnitude. Through using an adjustable drive current value, a voltage Vtx can be adjusted, e.g., reduced, to substantially reduce or optimize power consumption of transmitting portion Tx 106 when an actual value of received signal 300 is below a theoretical or expected value of received signal 300.

Figure 5:
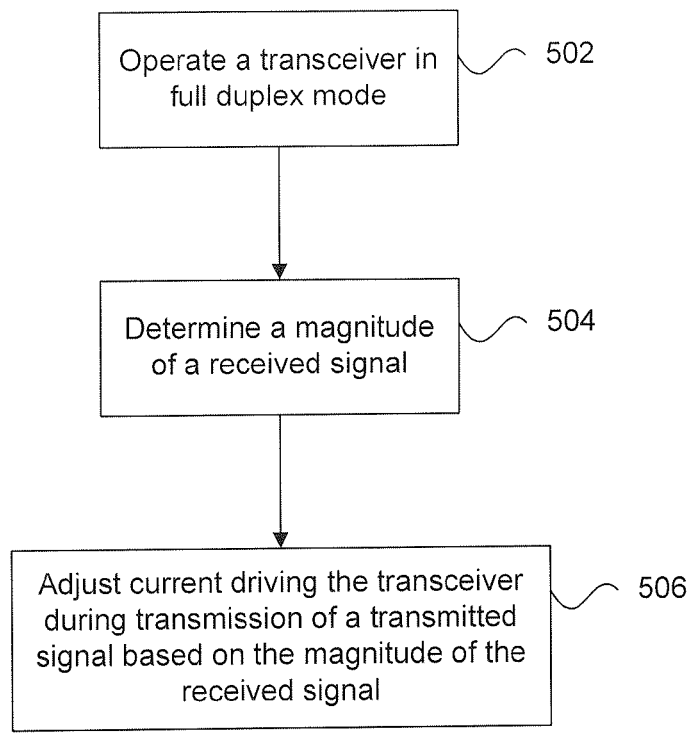
FIGS. 5 and 6 show flowcharts depicting various methods.

FIG. 5 shows a flowchart depicting a method 500. In step 502, a transceiver operates in full duplex mode. In step 504, a magnitude of a received signal is determined. In step 506, a current driving the transceiver during transmission of a transmitted signal is adjusted based on the magnitude of the received signal.

Figure 6:
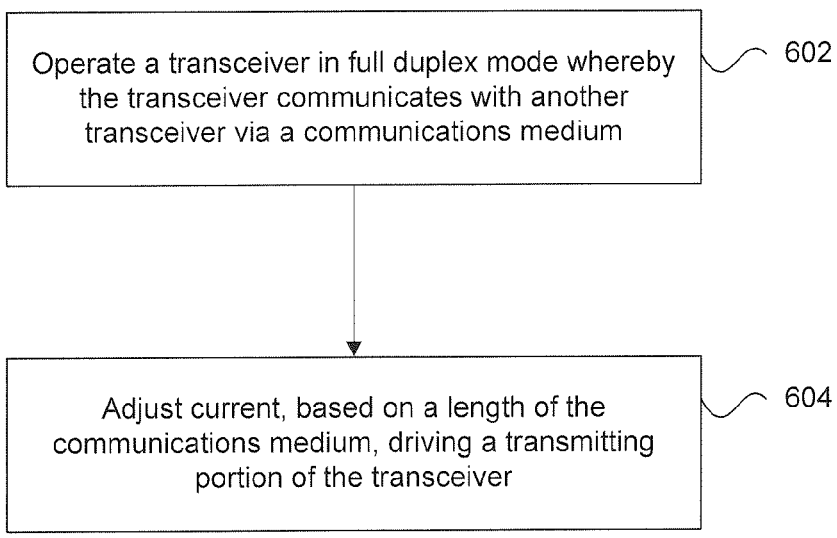

FIG. 6 shows a flowchart depicting a method 600. In step 602, a transceiver operates in full duplex mode, whereby the transceiver communicates with another transceiver via a communications medium. In step 604, current is adjusted, based on a length of the communications medium, where the current drives a transmitting portion of the transceiver.

It is to be appreciated that the Detailed Description section, and not the Abstract section, is intended to be used to interpret the claims. The Abstract section may set forth one or more, but not all, exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
   a transceiver configured to operate in full-duplex mode, the transceiver comprising a transmitting portion and a receiving portion, wherein:
      the transmitting portion is configured to transmit a first signal comprising a first magnitude value, and
      the receiving portion is configured to receive a second signal comprising a second magnitude value;
   an analog-to-digital converter configured to determine the second magnitude value; and
   a controller coupled to the analog-to-digital converter and configured to generate a control signal based on the second magnitude value,
   wherein the control signal adjusts current driving the transmitting portion to a minimum current value that is required to generate a third signal comprising a third magnitude value, the third magnitude value being equal to a sum of the first and second magnitude values.

2. The system of claim 1, wherein the minimum current value allows for generation of a threshold voltage value of the third signal.

3. The system of claim 1, wherein the first magnitude value is equal or different from the second magnitude value.

4. The system of claim 1, wherein the controller transmits the control signal to another transceiver coupled to the transceiver via a communications medium.

5. The system of claim 1, wherein the communications medium allows for Ethernet communications.

6. A system comprising:
   a transceiver configured to operate in full-duplex mode with a remote transceiver over a communications medium, the transceiver comprising a transmitting portion and a receiver, wherein:
      the transmitting portion is configured to transmit a first signal comprising a first magnitude value, and
      the receiving portion is configured to receive a second signal comprising a second magnitude value; and
   a controller coupled to the transceiver and configured to generate a control signal based on a length value of the communications medium,
   wherein the control signal adjusts current driving the transmitting portion to a minimum current value that is required to generate a third signal comprising a third magnitude value, the third magnitude value being equal to a sum of the first and second magnitude values, the third magnitude value being equal to a sum of the first and second magnitude values.

7. The system of claim 6, wherein the minimum current value allows for generation of a threshold voltage value of the third signal.

8. The system of claim 6, wherein the first magnitude value is equal or different from the second magnitude value.

9. The system of claim 6, wherein the communications medium allows for Ethernet communications.

10. A method comprising:
    transmitting, using a transmitting portion of a transceiver, a first signal comprising a first magnitude value;
    receiving, using a receiving portion of the transceiver, a second signal comprising a second magnitude value;
    determining, using an analog-to-digital converter, the second magnitude value;
    generating, using a controller, a control signal based on the second magnitude value, wherein the controller is coupled to the analog-to-digital converter; and
    adjusting, based on the control signal, current driving the transmitting portion to a minimum current value that is required to generate a third signal comprising a third magnitude value, the third magnitude value being equal to a sum of the first and second magnitude values.

11. The method of claim 10, further comprising generating a threshold magnitude of the third signal based on the minimum current value.

12. The method of claim 11, wherein the threshold magnitude is a threshold voltage value.

13. The method of claim 10, wherein the first magnitude value is equal or different from the second magnitude value.

14. The method of claim 10, wherein the second magnitude value is a voltage value.

15. The method of claim 10, wherein, using the controller, a drive current is generated based on the second magnitude value.

16. The method of claim 15, further comprising generating a threshold voltage value of the third signal based on the drive current.

17. The method of claim 10, further comprising transmitting the control signal to another transceiver coupled to the transceiver via a communications medium.

18. A method comprising:
- transmitting, using a transmitting portion of a transceiver, a first signal comprising a first magnitude value to another transceiver via a communications medium;
- receiving, using a receiving portion of the transceiver, a second signal comprising a second magnitude value from the another transceiver via the communications medium;
- generating, using a controller, a control signal based on a length value of the communications medium, wherein the controller is coupled to the transceiver; and
- adjusting, based on the control signal, current driving the transmitting portion to a minimum current value that is required to generate a third signal comprising a third magnitude value, the third magnitude value being equal to a sum of the first and second magnitude values.

19. The method of claim 18, further comprising generating a threshold voltage value of the third signal.

20. The method of claim 18, wherein the communications medium allows for Ethernet communications.

* * * * *

UNITED STATES PATENT AND TRADEMARK OFFICE
CERTIFICATE OF CORRECTION

PATENT NO.          : 8,867,352 B2
APPLICATION NO.     : 12/770222
DATED               : October 21, 2014
INVENTOR(S)         : Tam et al.

It is certified that error appears in the above-identified patent and that said Letters Patent is hereby corrected as shown below:

In the Claims

Column 5, line 47, claim 1, please replace "a transmitting portion" with --a transmitter--.

Column 5, line 48, claim 1, please replace "a received portion" with --a receiver--.

Column 5, line 49, claim 1, please replace "the transmitting portion" with --the transmitter--.

Column 5, line 51, claim 1, please replace "the receiving portion" with --the receiver--.

Column 5, lines 58-59, claim 1, please replace "the transmitting portion" with --the transmitter--.

Column 5, line 60, claim 1, please replace "a third signal comprising" with --a third signal for transmission by the transmitter, the third signal comprising--.

Column 6, lines 9-10, claim 6, please replace "a transmitting portion" with --a transmitter--.

Column 6, line 11, claim 6, please replace "the transmitting portion" with --the transmitter--.

Column 6, line 13, claim 6, please replace "the receiving portion" with --the receiver--.

Column 6, line 20, claim 6, please replace "a third signal comprising" with --a third signal for transmission by the transmitter, the third signal comprising--.

Column 6, lines 21-24, claim 6, please replace "the third magnitude value being equal to a sum of the first and second magnitude values, the third magnitude value being equal to the sum of the first and second magnitude values" with --the third magnitude value being equal to a sum of the first and second magnitude values--.

Column 6, line 33, claim 10, please replace "a transmitting portion" with --a transmitter--.

Column 6, line 35, claim 10, please replace "a receiving portion" with --a receiver--.

Column 6, lines 42-43, claim 10, please replace "the transmitting portion" with --the transmitter--.

Signed and Sealed this
Seventeenth Day of February, 2015

Michelle K. Lee
*Deputy Director of the United States Patent and Trademark Office*

CERTIFICATE OF CORRECTION (continued)
U.S. Pat. No. 8,867,352 B2

Column 6, line 44, claim 10, please replace "a third signal comprising" with --a third signal for transmission by the transmitter, the third signal comprising--.

Column 7, line 2, claim 18, please replace "a transmitting portion" with --a transmitter--.

Column 7, line 5, claim 18, please replace "a receiving portion" with --a receiver--.

Column 7, lines 12-13, claim 18, please replace "the transmitting portion" with --the transmitter--.

Column 7, line 14, claim 18, please replace "a third signal comprising" with --a third signal for transmission by the transmitter, the third signal comprising--.